[19] 4,115,631
[45] Sep. 19, 1978

Deb

[54] ENERGY STORING PHOTOGALVANIC CELL HAVING DIELECTRIC OVERCOATING

[75] Inventor: Satyendra Kumar Deb, East Brunswick, N.J.

[73] Assignees: Optel Corporation, Princeton, N.J.; Grumman Aerospace Corporation, Bethpage, N.Y.

[21] Appl. No.: 706,077

[22] Filed: Jul. 16, 1976

[51] Int. Cl.² .................. H01M 6/30; H01M 6/36
[52] U.S. Cl. .................................................. 429/111
[58] Field of Search .................. 429/111; 136/89 NB

[56] References Cited

U.S. PATENT DOCUMENTS 3,708,220   1/1973   Meyers et al. .................. 350/160 R

*Primary Examiner*—Aaron Weisstuch
*Attorney, Agent, or Firm*—Morris Liss; Israel Gopstein

[57] ABSTRACT

A photogalvanic cell having an electrode and a counterelectrode positioned in spaced registry. A charge storage layer containing a transition metal oxide covers the electrode while a semi-solid electrolyte covers the counterelectrode. An overcoat layer containing tin oxide is disposed in intervening contact between the charge storage layer and the semi-solid electrolyte. The cell converts light energy to electrical energy and also stores electrical charge for use after the cell is no longer exposed to light.

8 Claims, 1 Drawing Figure

ENERGY STORING PHOTOGALVANIC CELL HAVING DIELECTRIC OVERCOATING

FIELD OF THE INVENTION

The present invention relates to photogalvanic cells and more particularly to such a cell which is capable of storing electrical charge for use after the removal of a light source.

BRIEF DESCRIPTION OF THE PRIOR ART

An earlier filed co-pending application, assigned to the assignee hereof, now U.S. Pat. No. 4,085,257, filed May 30, 1975, and herein incorporated by reference relates to a photogalvanic cell having energy storage properties. In this co-pending patent application, an electrode and spaced counterelectrode "sandwich" adjacent contacting layers of a semisolid electrolyte and a charge storage layer, the latter including tungsten oxide ($WO_3$). In the device of the co-pending application, it was considered necessary to locate the electrolyte adjacent the charge storage layer to ensure ionic charge transport from the electrolyte to the charge storage layer. Although a device built in accordance with the co-pending application works satisfactorily for some time, it has been discovered that the charge storage layer cannot be cycled for long periods of time without an observeable decrease in the photogalvanic and charge storage capabilities of the cell.

BRIEF DESCRIPTION OF THE PRESENT INVENTION

The present invention relates to the disposition of an overcoat layer between the electrolyte and charge storage layers to increase the useful life of a photogalvanic cell of the type described. The overcoat layer is fabricated from a material in the form of a thin film and serves to inhibit attack and degradation of the charge storage layer.

BRIEF DESCRIPTION OF THE FIGURE

The above-mentioned objects and advantages of the present invention will be more clearly understood when considered in conjunction with the accompanying drawing, in which:

The FIGURE is a cross sectional view of the present device indicating the various layers which comprise the invention.

DETAILED DESCRIPTION OF THE INVENTION

Figure 1:
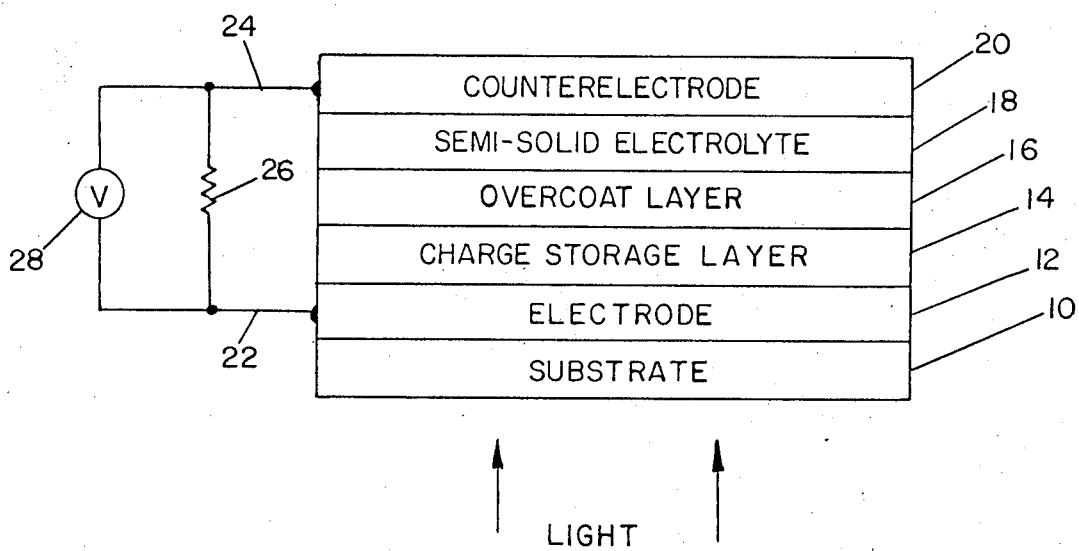

Referring to the FIGURE the structure of the present cell is seen to include a light passing substrate 10 covered by a light passing conducting electrode 12. The substrate and electrode are commercially available as a prefabricated material known in the industry as NESA glass. A charge storage layer 14 covers the electrode 12. The charge storage layer 14 may be an evaporated tungsten oxide ($WO_3$) film formed by conventional vacuum evaporation techniques. The charge storage layer 14 may also be formed by molybdenum oxide, vanadium oxide, niobium oxide or tantalum oxide, as disclosed at page 4, lines 10 through 14, of the above-referenced co-pending application. It should be noted, however, that these materials must be chemically compatible with the compensator layer.

The overcoat layer 16 must be permeable to the electrolyte cation, which in the preferred devices is hydrogen. The layer must also be more resistant to attack from the semi-solid electrolyte 18 than the charge storage layer 14.

It has been discovered that the preferred overcoat layer 16 is a layer of tin oxide ($SnO_2$) from 100 to 1,000 Å thick. The tin oxide may also be doped with antimony for example. Other suitable layers include silicon oxide, silicon oxide doped with gold, titanium oxide and chromium nitride, as well as mixtures of the above. These layers are preferably formed using well-known sputtering techniques.

The overcoat layer is covered with the semi-solid electrolyte 18 which is theorized to function as a source of charge compensating ions and is typically an acidic medium in the form of a liquid or gel. Suitable electrolytes may be found in the prior art such as disclosed in U.S. Pat. No. 3,708,220. A preferred electrolyte is a sulfuric acid solution wherein the sulfuric acid may be mixed with materials such as water, glycerine, polyvinyl alcohol, or combinations thereof so as to obtain the desired consistency and conductivity.

The counterelectrode 20 covers the semi-solid electrolyte 18 and may be either transparent or opaque and may be selected from a conductive material which is nonreactive with the layer in contact with it. Typical counterelectrode materials include noble metals, acid-resistant metals and carbon.

Leads 22 and 24 are respectively connected to the electrode 12 and counterelectrode 20. The leads will exhibit a voltage measurable by voltmeter 28 when the device is exposed to light as shown. Thus, as in the case of conventional photogalvanic cells, a load 26 placed across the leads 24 and 22 will draw current during the conversion of light energy to electrical energy. However, the present device will further store electrical charge for use after light is removed thereby acting as a storage battery capable of driving the load 26 after the light has been removed.

Normally, one would expect that the placement of an insulating dielectric layer, such as the overcoat layer 16 separating the semi-solid electrolyte 18 and the charge storage layer 14, would inhibit the necessary current flow of the device and thus be detrimental to the normal operation of the device. Contrary to this, however, it has been discovered that the insertion of the overcoat layer 16 substantially increases the life of the device by inhibiting attack of the charge storage layer 14.

As an additional design consideration, the $TiO_2$ used in the overcoat layer 16 has been used in the rutile form. However, the anatase form may similarly be used.

It should be understood that the invention is not limited to the exact details of construction shown and described herein for obvious modifications will occur to persons skilled in the art.

I claim the following:

1. A multiple layer photogalvanic cell capable of storing electrical charge comprising:
   a transparent substrate;
   a light transmissive electrode supported on the substrate;
   a transition metal charge storing layer covering the electrode;
   a layer overcoating the charge storage layer;
   a semi-solid electrolyte covering the overcoat layer, the overcoat layer
   (a) insulating the semi-solid electrolyte from the charge storage layer;

(b) being permeable to the cation of the electrolyte; and (c) being resistant to attack by said semi-solid electrolyte;

a counterelectrode covering the semi-solid electrolyte; and leads connected to the electrode and counterelectrode for producing a voltage therebetween when the cell converts light energy impinging thereon to electrical energy, the voltage being maintained after removal of light due to charge storage by the cells.

2. The subject matter set forth in claim 1 wherein the charge storage layer includes tungsten oxide.

3. The subject matter set forth in claim 1 wherein the overcoat layer includes the oxide of a preselected metal.

4. The subject matter set forth in claim 3 wherein the overcoat layer is $TiO_2$ in the rutile form.

5. The subject matter set forth in claim 3 wherein the overcoat layer is $TiO_2$ in the anatase form.

6. The subject matter set forth in claim 1 wherein the semi-solid electrolyte includes an acidic medium mixed with a material which produces an electrolyte of preselected consistency.

7. A multiple layer photogalvanic cell capable of storing electrical charge comprising:

a transparent substrate;

a light transmissive electrode supported on the substrate;

a charge storing layer covering the electrode, this layer including tungsten oxide;

a layer overcoating the charge storage layer, the overcoat layer including the oxide of a preselected metal;

a semi-solid electrolyte covering the overcoat layer, the overcoat layer insulating the semi-solid electrolyte from the charge storage layer and being permeable to the cation of the electrolyte, the electrolyte including an acidic medium mixed with a material which produces an electrolyte of preselected consistency;

a counterelectrode covering the semi-solid electrolyte; and leads connected to the electrode and counterelectrode for producing a voltage therebetween when the cell converts light energy impinging thereon to electrical energy, the voltage being maintained after removal of light due to charge storage by the cell.

8. The subject matter set forth in claim 3 wherein the overcoat layer is $SnO_2$.

* * * * *